(12) United States Patent
Hall et al.

(10) Patent No.: US 10,458,523 B2
(45) Date of Patent: Oct. 29, 2019

(54) AUTOMATIC GEAR-SHIFTING DEVICE

(71) Applicants: David R. Hall, Provo, UT (US); Daniel Madsen, Vineyard, UT (US); Joe Fox, Spanish Fork, UT (US); Nathan Davis, Bountiful, UT (US); Halle Murray, Provo, UT (US)

(72) Inventors: David R. Hall, Provo, UT (US); Daniel Madsen, Vineyard, UT (US); Joe Fox, Spanish Fork, UT (US); Nathan Davis, Bountiful, UT (US); Halle Murray, Provo, UT (US)

(73) Assignee: Hall Labs LLC, Provo, UT (US)

( * ) Notice: Subject to any disclaimer, the term of this patent is extended or adjusted under 35 U.S.C. 154(b) by 190 days.

(21) Appl. No.: 15/660,061

(22) Filed: Jul. 26, 2017

(65) Prior Publication Data

US 2019/0032754 A1    Jan. 31, 2019

(51) Int. Cl.

| F16H 3/44 | (2006.01) |
| F16H 3/66 | (2006.01) |
| F16H 63/30 | (2006.01) |
| F16H 63/04 | (2006.01) |
| B25F 5/00 | (2006.01) |
| F16H 61/04 | (2006.01) |
| F16H 61/32 | (2006.01) |

(52) U.S. Cl.
CPC ............. *F16H 3/666* (2013.01); *B25F 5/001* (2013.01); *F16H 63/04* (2013.01); *F16H 63/304* (2013.01); *F16H 3/66* (2013.01); *F16H 61/32* (2013.01); *F16H 2061/047* (2013.01); *F16H 2063/3056* (2013.01); *F16H 2200/201* (2013.01); *F16H 2200/2007* (2013.01)

(58) Field of Classification Search
CPC .................................. B25F 5/001; F16H 3/44
See application file for complete search history.

(56) References Cited

U.S. PATENT DOCUMENTS

| 9,217,492 B2 * | 12/2015 | Kierspe | ................... B25F 5/001 |
| 2018/0354114 A1 * | 12/2018 | Bantle | ................... B25D 16/006 |
| 2019/0001478 A1 * | 1/2019 | Bantle | ................... B25D 16/006 |
| 2019/0047125 A1 * | 2/2019 | Junkers | ................... B25F 5/005 |

* cited by examiner

*Primary Examiner* — Tisha D Lewis

(57) ABSTRACT

A gear-shifting device is described herein. The device includes a first motor having a first stator. The first stator turns clockwise and counter-clockwise, creating a wobbling action. The device further includes a compound planetary transmission, consisting of a transmission ring attached to a ring gear, and receiving power from the first stator. The device further includes a second motor having a second stator. The second stator turns clockwise and counter-clockwise. The device further includes a shift assembly, consisting of a drum, a cap, and a pinion gear. The pinion gear receives power from the second stator. The drum locks with the pinion gear such that the drum rotates with the pinion gear. The transmission ring is attached to the drum, such that the transmission ring moves laterally as the drum rotates. The ring gear locks and unlocks with the cap as the drum rotates. The wobbling action enables the locking.

20 Claims, 6 Drawing Sheets

AUTOMATIC GEAR-SHIFTING DEVICE

FIELD OF THE INVENTION

This invention relates generally to geared devices. More particularly, we are interested in speed changing devices for use in changing the rotational speed of the output of a motor.

BACKGROUND

Power tools are a household item, and are often used on a daily basis. Manufacturers of power tools are challenged with providing power tools that have diverse functionality and are easily operable. Many power tools, such as screw drivers and winches, require shifting gears manually to increase speed or power. This requires these items to be directly accessible to the user at all times, so that the user can apply manual force to change modes. This decreases the versatility of power tools and makes them harder to operate remote from the user. The ability to shift gears and change modes automatically is needed.

United States patent publication number 2008/7314097, to Cheryl Jenner, et al., teaches a drill with a mode-changeover mechanism. The mode-changeover mechanism changes the speed and mode of the drill by locking and unlocking planetary gear systems. The present disclosure differs from this prior art disclosure in that the prior art disclosure uses manual force and springs to slide the ring gear, and lock or unlock the planetary gear systems. This prior art disclosure is pertinent and may benefit from the devices disclosed herein and is hereby incorporated for reference in its entirety for all that it teaches.

United States patent publication number 2010/7703751, to Ronald L. Elliott, et al., teaches a winch assembly including a clutch mechanism. The winch is rotated by a gear assembly consisting of a ring gear and planetary gear system, and changes speed as the planetary gear system locks or unlocks. The present disclosure differs from this prior art disclosure in that the prior art disclosure is a single-stage gear system, requires the gear shift to be completed manually, and has a stationary ring gear. This prior art disclosure is pertinent and may benefit from the devices disclosed herein and is hereby incorporated for reference in its entirety for all that it teaches.

United States patent publication number 2008/0078980, to Richard E. Aho, et al., teaches a high-torque multi-speed winch. The adjustable speed winch uses a first gear reduction to change speeds. When the first gear reduction is engaged, the winch is rotated at a second speed. The present disclosure differs from this prior art disclosure in that the prior art disclosure is a single-stage gear system, requires the gear shift to be completed manually, and couples the gear system to the drum. This prior art disclosure is pertinent and may benefit from the devices disclosed herein and is hereby incorporated for reference in its entirety for all that it teaches.

SUMMARY

A gear-shifting device is disclosed. The gear-shifting device comprises a first motor having a first rotational stator. The first stator turns both clockwise and counter-clockwise, and creates a wobbling action. The device further comprises a compound planetary transmission, comprising a transmission ring attached to a first ring gear. The compound planetary transmission receives rotary power from the first stator. The device further comprises a second motor having a second rotational stator. The second stator turns both clockwise and counter-clockwise. The device further comprises a shift assembly, comprising a drum, a cap, and a pinion gear. The pinion gear receives rotary power from the second stator. The drum locks with the pinion gear such that the drum rotates as the pinion gear rotates. The transmission ring is attached to the drum, such that the transmission ring moves laterally as the drum rotates. The first ring gear alternately locks and unlocks with the cap as the drum rotates. The wobbling action enables the locking.

The compound planetary transmission may further comprise one or more planetary gear sets and one or more second ring gears. The first ring gear may lock with a first planetary gear set.

The first ring gear may comprise first laterally-oriented teeth of uniform width, first inwardly-oriented teeth of uniform width, and a slot on the outside portion of the first ring gear.

The transmission ring may comprise one or more outward pins and one or more inward pins. The one or more outward pins may extend radially outward from the transmission ring. The one or more inward pins may engage with the slot such that the transmission ring and the first ring gear move independently radially and together laterally.

The drum may comprise one or more tracks that follow a helical path and second inwardly-facing teeth. The pinion gear may lock with the inwardly-facing teeth, causing the drum to rotate. The one or more outward pins may engage in one of the one or more tracks such that the transmission ring follows a linear path as the drum rotates.

The cap may comprise second laterally-oriented teeth. The second laterally-oriented teeth may face the first laterally-oriented teeth.

The first laterally-oriented teeth may lock with the second laterally-oriented teeth as the one or more outward pins reach the first end of the one or more tracks. The first planetary gear set may lock together and rotate as one. The first laterally-oriented teeth may unlock from the second laterally-oriented teeth as the one or more outward pins reach a second end of the one or more tracks. The first planetary gear set may freely rotate.

The wobbling action may further comprise a degree of rotation correlating directly with the width of a single tooth of the first laterally-oriented teeth. The width of the single tooth may be between 0.5 mm and 13 mm.

A detector may be provided which may detect the radial position of the drum as the drum is rotated by the pinion gear.

The detector may comprise a Hall effect sensor, which detects one or more magnets attached to the drum. The one or more magnets may be positioned such that the Hall effect sensor detects the one or more magnets as the one or more pins alternately reach the first end and the second end of the one or more tracks.

The detector may comprise a range finder, which detects one or more elevated pips attached to the drum. The one or more elevated pips may be positioned such that the range finder detects the one or more elevated pips as the one or more pins alternately reach the first end and the second end of the one or more tracks.

The detector may comprise a circuit closed by a wire and one or more pips attached to the drum. The one or more pips may be positioned such that the circuit closes as the one or more pins alternately reach the first end and the second end of the one or more tracks.

The detector may comprise a current sensor, which measures current consumed by the second motor. The current would increase as the one or more pins alternately reach the first end and the second end of the one or more tracks.

The second motor may comprise one or more encoders, which generate a signal instructing the second motor to rotate the pinion gear clockwise or counter-clockwise such that the one or more pins alternately reach the first end and the second end of the one or more tracks.

The drum may be fixed relative to the first motor. The gear-shifting device may cause rotation of a third rotational stator.

The gear reduction between the first motor and the third rotational stator may be 4:1 as the one or more pins reach the first end of the one or more tracks or 16:1 as the one or more pins reach the second end of the one or more tracks.

The compound planetary transmission and shift assembly may comprise plastic, brass, stainless steel, carbon steel, galvanized steel, ceramics, or combinations thereof The first motor may comprise a first communication system. The first communication system may have one or more "BLUETOOTH" communication chips, an Internet WI-FI transceiver, a network transceiver, a Z-WAVE network transceiver, or combinations thereof. The first communication system may communicate with an external remote controller. The second motor may comprise a second communication system. The second communication system may have one or more "BLUETOOTH" communication chips, an Internet WI-FI transceiver, a network transceiver, a Z-WAVE network transceiver, or combinations thereof. The second communication system may communicate with an external remote controller. The first communication system may receive instructions from the external remote controller and generate a signal instructing the first motor to rotate the first rotational stator or stop rotation of the first rotational stator. The second communication system may receive instructions from the external remote controller and generate a signal instructing the second motor to rotate the second rotational stator clockwise or counter-clockwise, such that the one or more pins move along the one or more tracks.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
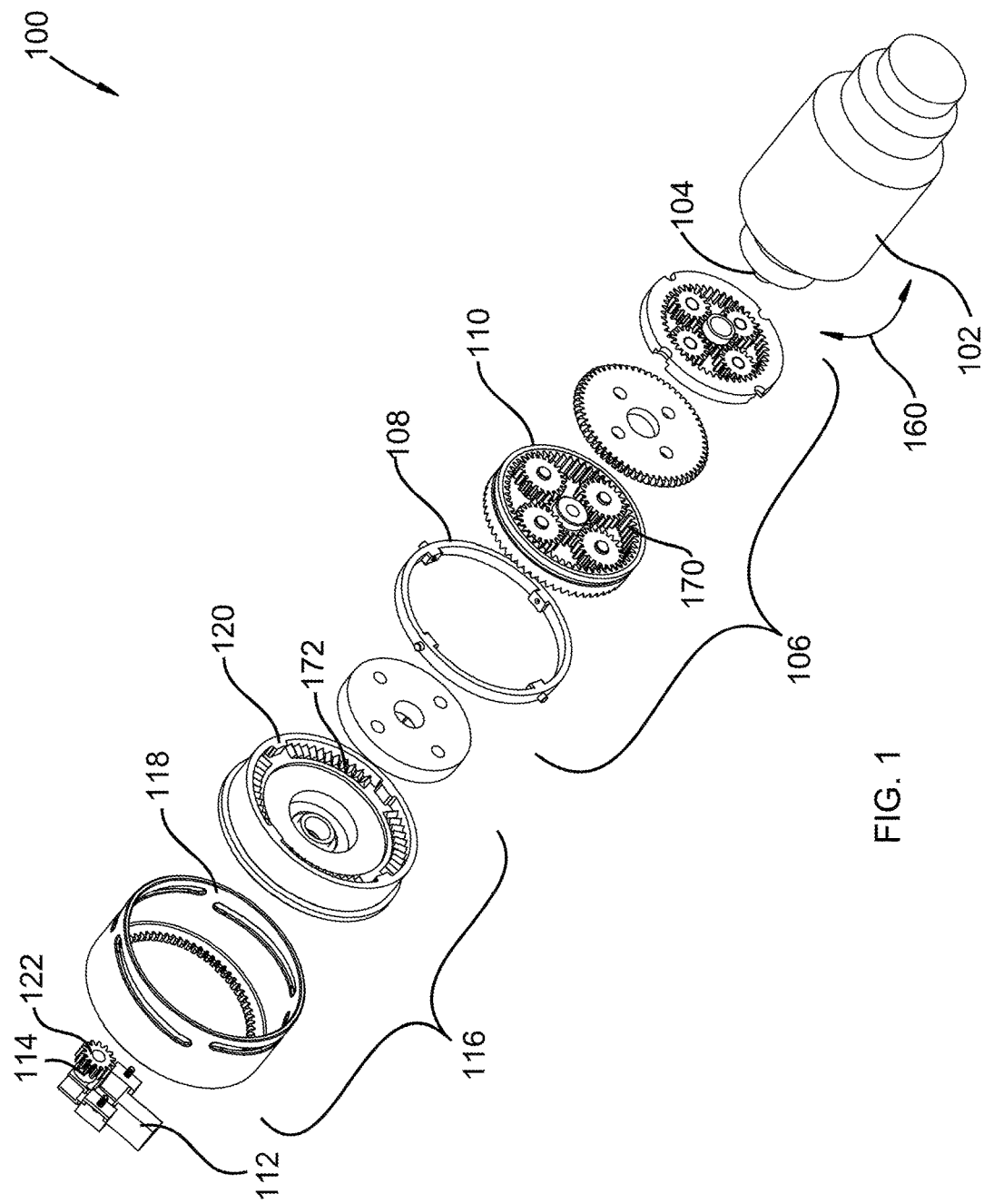
FIG. 1 shows an exploded isometric view of a gear-shifting device.

Referring to FIG. 1, an exploded isometric view of a gear-shifting device 100 is shown, according to one embodiment of the present invention. The gear-shifting device comprises first motor 102, compound planetary transmission 106, second motor 112, and shift assembly 116. First motor 102 has first rotational stator 104. First rotational stator 104 turns both clockwise and counterclockwise, creating wobbling action 160. Compound planetary transmission 106 comprises transmission ring 108 attached to first ring gear 110. First ring gear 110 has teeth 170. Compound planetary transmission 106 receives rotary power from first rotational stator 104. Second motor 112 has second rotational stator 114. Second rotational stator 114 turns both clockwise and counter-clockwise. Shift assembly 116 comprises drum 118, cap 120, and pinion gear 122. Pinion gear 122 receives rotary power from second rotational stator 114. Drum 118 locks with pinion gear 122 such that drum 118 rotates as pinion gear 122 rotates. Transmission ring 108 is further attached to drum 118, such that transmission ring 108 moves laterally as drum 118 rotates. Cap 120 has teeth 172. First ring gear 110 alternately locks and unlocks with cap 120 as drum 118 rotates. Wobbling action 160 is required since teeth 170 of ring gear 110 and teeth 172 of cap 120 will not fully engage by being directly pushed together without significant force. The slight motion of wobbling action 160 allows the teeth to engage fully without significant linear force. Wobbling action 160 enables the lock.

Figure 2:
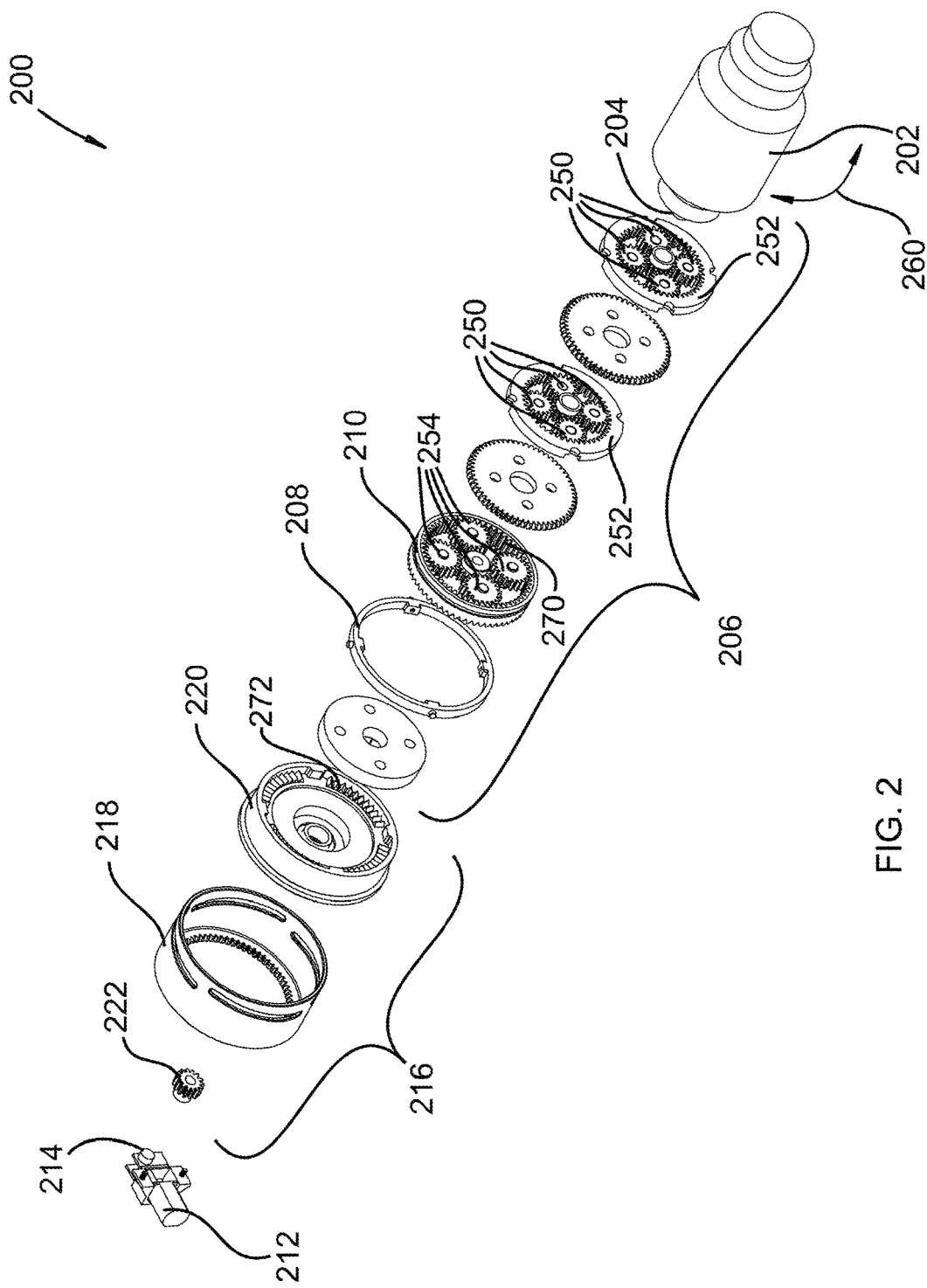
FIG. 2 shows an exploded isometric view of a gear-shifting device.

Referring to FIG. 2, an exploded isometric view of a gear-shifting device 200 is shown, according to one embodiment of the present invention. The gear-shifting device comprises first motor 202, compound planetary transmission 206, second motor 212, and shift assembly 216. First motor 202 has first rotational stator 204. First rotational stator 204 turns both clockwise and counterclockwise, creating wobbling action 260. Compound planetary transmission 206 comprises transmission ring 208 attached to first ring gear 210. First ring gear 210 has teeth 270. Compound planetary transmission 206 receives rotary power from first rotational stator 204. Compound planetary transmission 206 may comprise one or more planetary gear sets 250 and one or more second ring gears 252. First ring gear 210 locks with first planetary gear set 254. Second motor 212 has second rotational stator 214. Second rotational stator 214 turns both clockwise and counter-clockwise. Shift assembly 216 comprises drum 218, cap 220, and pinion gear 222. Pinion gear 222 receives rotary power from second rotational stator 214. Drum 218 locks with pinion gear 222 such that drum 218 rotates as pinion gear 222 rotates. Transmission ring 208 is further attached to drum 218, such that transmission ring 208 moves laterally as drum 218 rotates. Cap 220 has teeth 272. First ring gear 210 alternately locks and unlocks with cap 220 as drum 218 rotates. Wobbling action 260 is required since teeth 270 of ring gear 210 and teeth 272 of cap 220 will not fully engage by being directly pushed together without significant force. The slight motion of wobbling action 260 allows the teeth to engage fully without significant linear force. Wobbling action 260 enables the lock.

Figure 3:
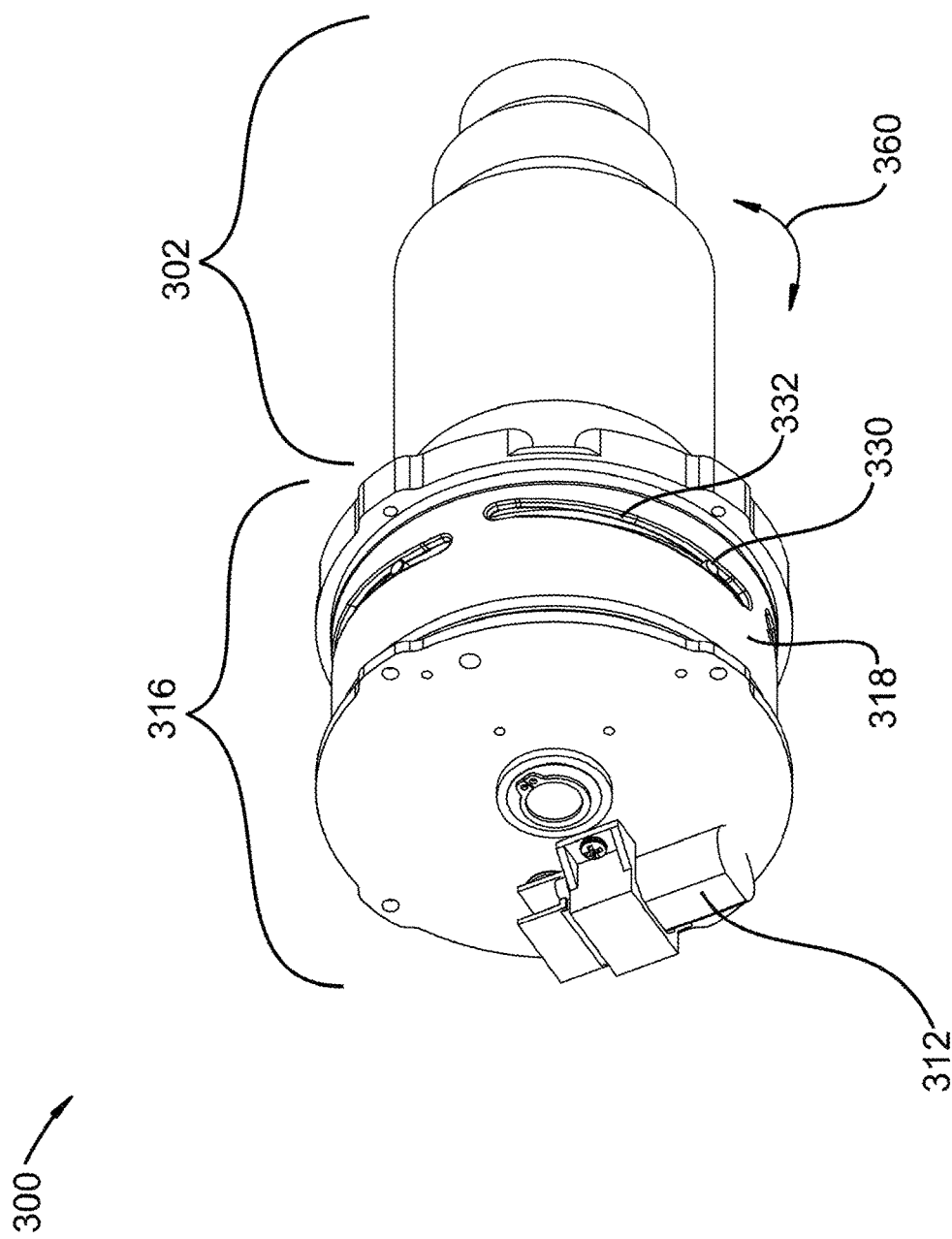
FIG. 3 shows an isometric view of a gear-shifting device.

Referring to FIG. 3, an isometric view of gear-shifting device 300 is shown, according to one embodiment of the present invention. The gear-shifting device comprises first motor 302, second motor 312, and shift assembly 316. First motor 302 has first rotational stator 104, of FIG. 1. First rotational stator 104 turns both clockwise and counterclockwise, creating wobbling action 360. Compound planetary transmission 106, of FIG. 1, is contained within shift assembly 316. Compound planetary transmission 106 comprises transmission ring 108 attached to first ring gear 110. First ring gear 110 has teeth 170. Transmission ring 108 comprises one or more outward pins 330. Outward pins 330 extend radially outward from transmission ring 108. Shift assembly 316 comprises drum 318, cap 120, of FIG. 1, and pinion gear 122, of FIG. 1. Cap 120 and pinion gear 122 are contained within drum 318. Cap 120 has teeth 172. Drum 318 comprises one or more tracks 332. Tracks 332 follow a helical pattern. Outward pins 330 engage in tracks 332 such that transmission ring 108 follows a linear path as drum 318 rotates. Drum 318 locks with pinion gear 122 such that drum 318 rotates as pinion gear 122 rotates. First ring gear 110 locks with cap 120 as outward pins 330 reach a first end of tracks 332. First ring gear 110 unlocks from cap 120 as outward pins 330 reach a second end of tracks 332. Wobbling action 360 is required since teeth 170 of ring gear 110 and teeth 172 of cap 120 will not fully engage by being directly pushed together without significant force. The slight motion of wobbling action 360 allows the teeth to engage fully without significant linear force. Wobbling action 360 enables the lock.

Figure 4:
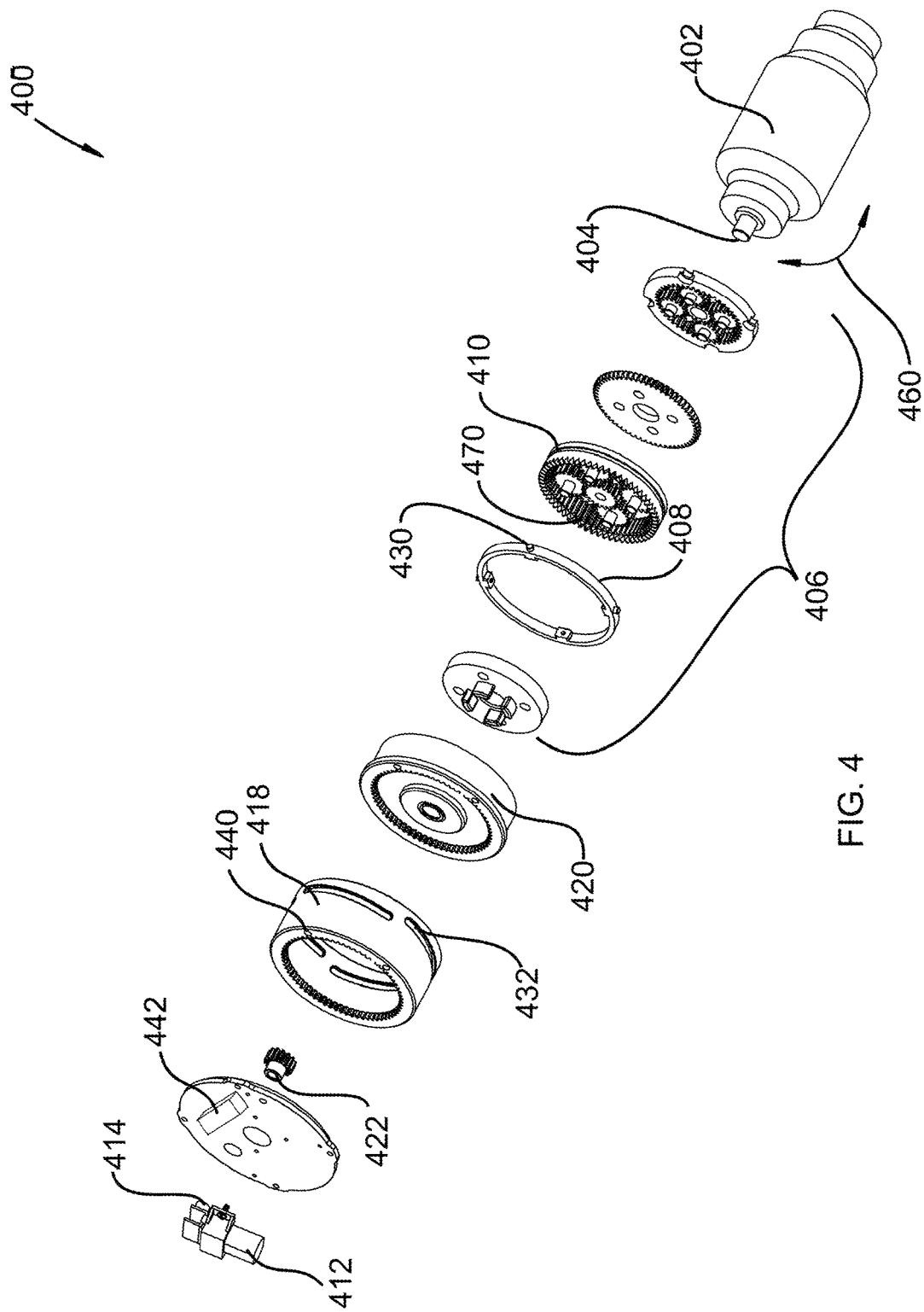
FIG. 4 shows an exploded isometric view of a gear-shifting device.

Referring to FIG. 4, an exploded isometric view of a gear-shifting device 400 is shown, according to one embodiment of the present invention. The gear-shifting device comprises first motor 402, compound planetary transmission 406, second motor 412, and shift assembly 416. First motor 402 has first rotational stator 404. First rotational stator 404 turns both clockwise and counterclockwise, creating wobbling action 460. Compound planetary transmission 406 comprises transmission ring 408 attached to first ring gear 410. First ring gear 410 has teeth 470. Compound planetary transmission 406 receives rotary power from first rotational stator 404. Second motor 412 has second rotational stator 414. Second rotational stator 414 turns both clockwise and counter-clockwise. Shift assembly 416 comprises drum 418, cap 420, and pinion gear 422. Cap 420 has teeth 172, of FIG. 1. Pinion gear 422 receives rotary power from second rotational stator 414. Drum 418 locks with pinion gear 422 such that drum 418 rotates as pinion gear 422 rotates. Transmission ring 408 comprises one or more outward pins 430. Drum 418 comprises one or more tracks 432 and one or more elevated pips 440. Outward pins 430 engage in tracks 432, such that transmission ring 408 moves laterally as drum 418 rotates. Detector 442 is provided. Detector 442 detects the radial position of drum 418 as drum 418 is rotated by pinion gear 422. Elevated pips 440 may be positioned such that detector 442 may detect elevated pips 440 as outward pins 430 reach either a first or second end of tracks 432. First ring gear 410 locks with cap 420 as outward pins 430 reach a first end of tracks 432. First ring gear 410 unlocks from cap 420 as outward pins 430 reach a second end of tracks 432. Wobbling action 460 is required since teeth 470 of ring gear 410 and teeth 172 of cap 420 will not fully engage by being directly pushed together without significant force. The slight motion of wobbling action 460 allows the teeth to engage fully without significant linear force. Wobbling action 460 enables the lock.

Figure 5:
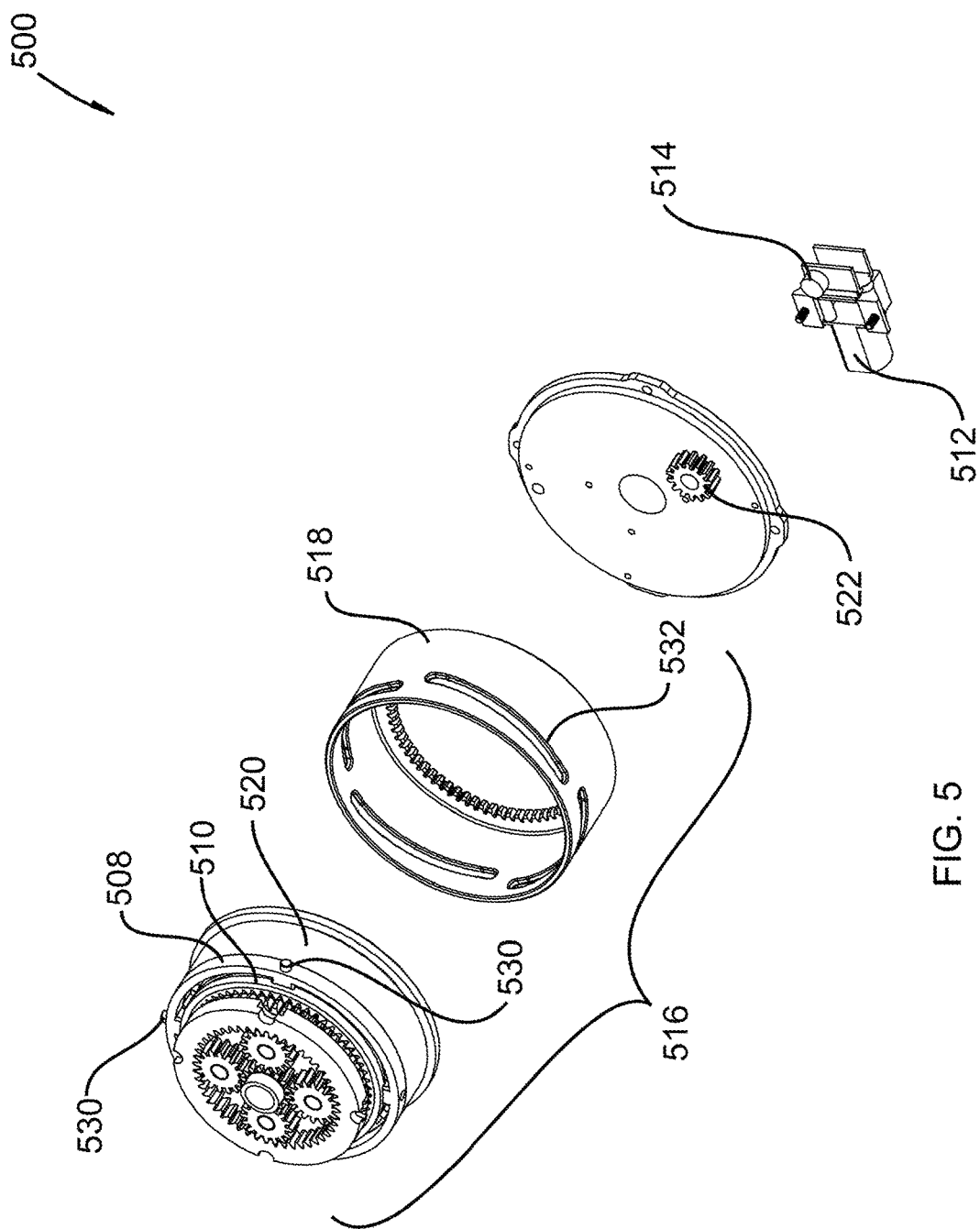
FIG. 5 shows an exploded isometric view of a portion of a gear-shifting device.

Referring to FIG. 5, an exploded isometric view of a portion of gear-shifting device 100, shift assembly 116, with cap 120 interlocked with first ring gear 110, of FIG. 1, is shown at 500, according to one embodiment of the present invention. The gear-shifting device comprises a compound planetary transmission, second motor 512, and shift assembly 516. The compound planetary transmission comprises transmission ring 508 attached to first ring gear 510. First ring gear 510 has teeth 170, of FIG. 1. Second motor 512 has second rotational stator 514. Second rotational stator 514 turns both clockwise and counter-clockwise. Shift assembly 516 comprises drum 518, cap 520, and pinion gear 522. Pinion gear 522 receives rotary power from second rotational stator 514. Drum 518 locks with pinion gear 522 such that drum 518 rotates as pinion gear 522 rotates. Transmission ring 508 comprises one or more outward pins 530. Drum 518 comprises one or more tracks 532. Outward pins 530 engage in tracks 532, such that transmission ring 508 moves laterally as drum 518 rotates. Cap 520 has teeth 172, of FIG. 1. First ring gear 510 locks with cap 520 as outward pins 530 reach a first end of tracks 532. First ring gear 510 unlocks from cap 520 as outward pins 530 reach a second end of tracks 532.

Figure 6:
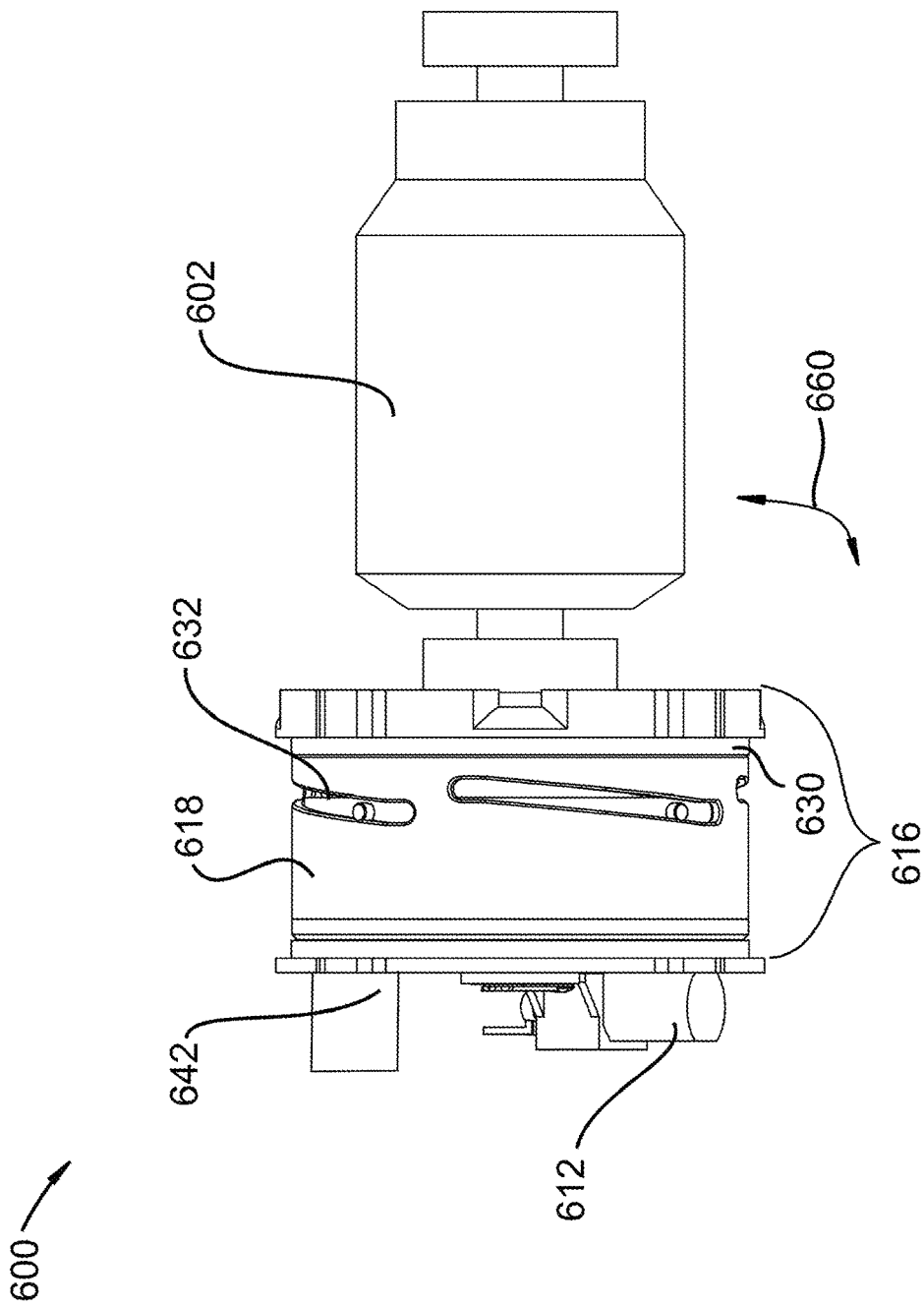
FIG. 6 shows a side view of a gear-shifting device.

Referring to FIG. 6, a side view of gear-shifting device 600 is shown, according to one embodiment of the present invention. The gear-shifting device comprises first motor 602, second motor 612, and shift assembly 616. First motor 602 has first rotational stator 104, of FIG. 1. First rotational stator 104 turns both clockwise and counterclockwise, creating wobbling action 660. Compound planetary transmission 106, of FIG. 1, is contained within shift assembly 616. Compound planetary transmission 106 comprises transmission ring 108 attached to first ring gear 110. First ring gear 110 has teeth 170. Transmission ring 108 comprises one or more outward pins 630. Outward pins 630 extend radially outward from transmission ring 108. Shift assembly 616 comprises drum 618, cap 120, of FIG. 1, and pinion gear 122, of FIG. 1. Cap 120 and pinion gear 122 are contained within drum 618. Cap 120 has teeth 172. Drum 618 comprises one or more tracks 632 and one or more magnets within drum 618. Tracks 632 follow a helical pattern. Outward pins 630 engage in tracks 632 such that transmission ring 108 follows a linear path as drum 618 rotates. Detector 642 is provided. Detector 642 detects the radial position of drum 618 as drum 618 is rotated by pinion gear 122. Detector 642 comprises a Hall effect sensor. The one or more magnets within drum 618 may be positioned such that detector 642 may detect the magnets as outward pins 630 reach either a first or second end of tracks 632. Drum 618 locks with pinion gear 122 such that drum 618 rotates as pinion gear 122 rotates. First ring gear 110 locks with cap 120 as outward pins 630 reach a first end of tracks 632. First ring gear 110 unlocks from cap 120 as outward pins 630 reach a second end of tracks 632. Wobbling action 660 is required since teeth 170 of ring gear 110 and teeth 172 of cap 120 will not fully engage by being directly pushed together without significant force. The slight motion of wobbling action 660 allows the teeth to engage fully without significant linear force. Wobbling action 660 enables the lock.

In some embodiments, the detector comprises a circuit closed by a wire and one or more pips attached to the drum. The one or more pips are positioned such that the circuit closes as the one or more pins alternately reach the first end and the second end of the one or more tracks.

In some embodiments, the detector comprises a current sensor. The current sensor measures current consumed by the second motor. The current increases as the one or more pins alternately reach the first end and the second end of the one or more tracks.

In some embodiments, the second motor comprises one or more encoders. The one or more encoders generate a signal instructing the second motor to rotate the pinion gear clockwise or counter-clockwise, such that the one or more pins alternately reach the first end and the second end of the one or more tracks.

In some embodiments, the drum is fixed relative to the first motor. The gear-shifting device causes rotation of a third rotational stator. In some embodiments, the gear reduction between the first motor and the third rotational stator is 4:1 as the one or more pins reach the first end of the one or more tracks or 16:1 as the one or more pins reach the second end of the one or more tracks.

In some embodiments, the compound planetary transmission and shift assembly comprise plastic, brass, stainless steel, carbon steel, galvanized steel, ceramics, or combinations thereof.

In some embodiments, the first motor comprises a first communication system. The first communication system has one or more "BLUETOOTH" communication chips, an Internet WI-FI transceiver, a network transceiver, a Z-WAVE network transceiver, or combinations thereof and communicates with an external remote controller. The second motor comprises a second communication system. The second communication system has one or more "BLUETOOTH" communication chips, an Internet WI-FI transceiver, a network transceiver, a Z-WAVE network transceiver, or combinations thereof and communicates with an external remote controller. The first communication system receives instructions from the external remote controller and generates a signal instructing the first motor to rotate the first rotational stator or stop rotation of the first rotational stator. The second communication system receives instructions from the external remote controller and generates a signal instructing the second motor to rotate the second rotational stator clockwise or counter-clockwise, such that the one or more pins move along the one or more tracks.

The invention claimed is:

1. A gear-shifting device comprising:
a first motor having a first rotational stator, the first stator turning both clockwise and counterclockwise, creating a wobbling action;
a compound planetary transmission, comprising a transmission ring attached to a first ring gear, the compound planetary transmission receiving rotary power from the first stator;
a second motor having a second rotational stator, the second stator turning both clockwise and counter-clockwise;
a shift assembly, comprising a drum, a cap, and a pinion gear, wherein the pinion gear receives rotary power from the second stator, the drum locking with the pinion gear such that the drum rotates as the pinion gear rotates;
the transmission ring further attached to the drum, such that the transmission ring moves laterally as the drum rotates; and
the first ring gear alternately locking and unlocking with the cap as the drum rotates, the wobbling action enabling the locking.

2. The device of claim 1, wherein the compound planetary transmission further comprises one or more planetary gear sets, and one or more second ring gears, the first ring gear locked with a first planetary gear set.

3. The device of claim 2, wherein the first ring gear comprises first laterally-oriented teeth, first inwardly-oriented teeth, and a slot on the outside portion of the first ring gear.

4. The device of claim 3, wherein the transmission ring comprises one or more outward pins and one or more inward pins, the one or more outward pins extending radially outward from the transmission ring, the one or more inward pins engaging with the slot such that the transmission ring and the first ring gear move independently radially and together laterally.

5. The device of claim 4, wherein the drum comprises one or more tracks that follow a helical path and second inwardly-facing teeth, the pinion gear locking with the inwardly-facing teeth, causing the drum to rotate, the one or more outward pins engaging in one of the one or more tracks such that the transmission ring follows a linear path as the drum rotates.

6. The device of claim 4, wherein the cap comprises second laterally-oriented teeth, the second laterally-oriented teeth facing the first laterally-oriented teeth.

7. The device of claim 6, wherein:
the first laterally-oriented teeth lock with the second laterally-oriented teeth as the one or more outward pins reach a first end of the one or more tracks, the first planetary gear set locking together and rotating as one;
the first laterally-oriented teeth unlock from the second laterally-oriented teeth as the one or more outward pins reach a second end of the one or more tracks, the first planetary gear set freely rotating.

8. The device of claim 7, wherein the wobbling action further comprises a degree of rotation correlating directly with the width of a single tooth of the first laterally-oriented teeth.

9. The device of claim 1, wherein a detector is provided which detects the radial position of the drum as the drum is rotated by the pinion gear.

10. The device of claim 9, wherein the detector comprises a Hall effect sensor, which detects one or more magnets attached to the drum, the one or more magnets positioned such that the Hall effect sensor detects the one or more magnets as one or more outward pins alternately reach a first end and a second end of one or more tracks.

11. The device of claim 9, wherein the detector comprises a range finder, which detects one or more elevated pips attached to the drum, the one or more elevated pips positioned such that the range finder detects the one or more elevated pips as one or more outward pins alternately reach a first end and a second end of one or more tracks.

12. The device of claim 9, wherein one or more pips are positioned such that a circuit closes as one or more outward pins alternately reach a first end and a second end of one or more tracks.

13. The device of claim 9, wherein the detector comprises a current sensor, the current sensor measuring current consumed by the second motor, the current increasing as one or more outward pins alternately reach a first end and a second end of one or more tracks.

14. The device of claim 1, wherein the second motor comprises one or more encoders, which generates a signal instructing the second motor to rotate the pinion gear clockwise or counter-clockwise, such that one or more outward pins alternately reach a first end and a second end of one or more tracks.

15. The device of claim 1, wherein the drum is fixed relative to the first motor, the gear-shifting device causing rotation of a third rotational stator.

16. The device of claim 15, wherein the ratio of rotations of the first motor and the third rotational stator is 4:1 as one or more outward pins reach a first end of the one or more tracks or 16:1 as the one or more pins reach a second end of one or more tracks.

17. The device of claim 1, wherein the compound planetary transmission and shift assembly comprise plastic, brass, stainless steel, carbon steel, galvanized steel, ceramics, or combinations thereof.

18. The device of claim 1, wherein:
the first motor comprises a first communication system, the first communication system communicating with an external remote controller;
the second motor comprises a second communication system, the second communication system communicating with an external remote controller;
the first communication system receiving instructions from the external remote controller and generating a signal instructing the first motor to rotate the first rotational stator or stop rotation of the first rotational stator; and
the second communication system receiving instructions from the external remote controller and generating a signal instructing the second motor to rotate the second rotational stator clockwise or counter-clockwise, such that one or more outward pins move along one or more tracks.

19. A gear-shifting device comprising:
a first motor having a first rotational stator, the first stator turning both clockwise and counterclockwise, creating a wobbling action;
a compound planetary transmission, comprising one or more planetary gear sets, a first ring gear, one or more second ring gears, and a transmission ring attached to the first ring gear, the compound planetary transmission receiving rotary power from the first stator;
the first ring gear comprising first laterally-oriented teeth, first inwardly-oriented teeth, and a slot on the outside portion of the first ring gear;
the wobbling action further comprising a degree of rotation correlating directly with the width of a single tooth of the first laterally-oriented teeth;
the transmission ring comprising one or more outward pins and one or more inward pins, the one or more outward pins extending radially outward from the transmission ring, the one or more inward pins engaging with the slot such that the transmission ring and the first ring gear move independently radially and together laterally;
a second motor having a second rotational stator, the second stator turning both clockwise and counterclockwise;
a shift assembly, comprising a drum, a cap, and a pinion gear, wherein the pinion gear receives rotary power from the second stator, the drum having one or more tracks that follow a helical path and second inwardly-facing teeth, the pinion gear locking with the second inwardly-facing teeth such that the drum rotates as the pinion gear rotates;
the one or more outward pins engaging in one of the one or more tracks such that the transmission ring follows a linear path as the drum rotates;
the cap comprising second laterally-oriented teeth, the second laterally-oriented teeth facing the first laterally-oriented teeth; and
the first laterally-oriented teeth alternately locking and unlocking with the cap as the one or more outward pins reach a first end and a second end of the one or more tracks, the wobbling action enabling the locking.

20. The gear-shifting device of claim 8, wherein the width of the single laterally-oriented tooth is between 0.5 mm and 13 mm.

* * * * *